United States Patent [19]

Smith et al.

[11] Patent Number: 5,274,489
[45] Date of Patent: Dec. 28, 1993

[54] THERMAL IMAGER SYSTEMS

[75] Inventors: Brian F. Smith, Rayleigh; Glenn M. Cuthbertson, Ingatestone, both of United Kingdom

[73] Assignee: Gec-Marconi Limited, Stanmore, England

[21] Appl. No.: 835,893

[22] Filed: Feb. 14, 1992

[30] Foreign Application Priority Data

Feb. 15, 1991 [GB] United Kingdom ............... 9103262

[51] Int. Cl.⁵ .............................................. G02B 26/08
[52] U.S. Cl. .................................. 359/211; 359/669; 359/837
[58] Field of Search ................... 359/211, 837, 669

[56] References Cited

U.S. PATENT DOCUMENTS

| 4,580,879 | 4/1986 | Wilson | 359/669 |
| 4,828,371 | 5/1989 | McCaslin et al. | 359/669 |
| 4,878,066 | 10/1989 | Shiraishi | 358/296 |
| 4,948,233 | 8/1990 | Maruyama | 359/669 |
| 5,136,417 | 8/1992 | Smith | 359/837 |

FOREIGN PATENT DOCUMENTS

| 823130 | 4/1956 | European Pat. Off. |
| 0256826 | 8/1987 | European Pat. Off. |
| 2647397 | 10/1976 | Fed. Rep. of Germany |
| 823131 | 3/1955 | United Kingdom |
| 747228 | 3/1956 | United Kingdom |
| 765775 | 1/1957 | United Kingdom |
| 800893 | 9/1958 | United Kingdom |
| 820130 | 9/1959 | United Kingdom |
| 873286 | 7/1961 | United Kingdom |
| 1083759 | 9/1967 | United Kingdom |
| 1344156 | 1/1974 | United Kingdom |
| 2182457 | 5/1987 | United Kingdom |
| 2187301 | 9/1987 | United Kingdom |
| WO85/01119 | 3/1985 | World Int. Prop. O. |

Primary Examiner—Bruce Y. Arnold
Assistant Examiner—James Phan
Attorney, Agent, or Firm—Jacobson, Price, Holman & Stern

[57] ABSTRACT

A thermal imager system comprises a scanning system 1 for scanning a required scene 2 and an anamorphic optical system 3 for focusing the scanned scene onto a Sprite detector 4, the optical anamorphic system comprises a pair of optical prisms 17, 19 disposed between a collimating element 15 and a focusing element 21, one or both of the prisms 17, 19 being pivotally mounted whereby the anamorphic ratio and hence the focal length of said optical system 3 may be changed. (FIG. 1).

5 Claims, 2 Drawing Sheets

THERMAL IMAGER SYSTEMS

This invention relates to thermal imager systems and is especially applicable to such systems incorporating an anamorphic optical system.

In GB Patent Application No. 2187301A and European Patent Application No. 0256826A2 there are disclosed prior art anamorphic optical systems and thermal imager systems incorporating such systems. The anamorphic optical systems which are described comprise a pair of prisms which are inverted relative to one another in order to compensate for temperature and wavelength changes and are used in thermal imager systems which include a so-called "Sprite" detector.

In thermal imager systems which use a Sprite detector, opto-mechanical scanning mechanisms are normally used the characteristics of which normally define the field of view (FOV) in the scanned direction. This scanned direction is normally in the azimuth plane. In this case the elevation FOV is determined by the detector channel separation and the focal length of the optical system. (In particular, the focal length in the elevation plane).

In a conventional isomorphic optical system a short focal length must be employed to obtain a large FOV and this can lead to problems of resolution. The resolution of a Sprite detector in the direction of scan is closely related to the effective size of its readout and its diffusion characteristics and can be enhanced by using larger focal lengths in this plane. This is commonly accomplished by using an anamorphic optical system having an elevation focal length chosen for FOV and an azimuth focal length optimised for azimuth resolution. These focal lengths however must be chosen with f number in mind to ensure adequate radiometry. One disadvantage of changing the azimuth focal length is that the scan velocity and therefore the required bias voltage of the Sprite detector must also change.

It is an object of the present invention to provide a thermal imager system incorporating an anamorphic optical system and a Sprite detector, which allows selection of the optimum azimuth focal length for the purpose of resolution and allows a variable elevation focal length to provide multiple field of view, without requiring the detector bias conditions to be changed.

According to the present invention there is provided a thermal imager system comprising scanning means for scanning a required scene and an anamorphic optical system for focusing the scanned scene onto a Sprite detector, said optical system comprising first and second optical energy transmission elements arranged in series between a collimating element and a focusing element for said Sprite detector, at least one of said transmission elements being pivotally mounted whereby the focal length of said optical system may be changed.

In a preferred arrangement it will be arranged that both of said first and second optical energy transmission elements are pivotally mounted for changing the focal length of said optical system, and the optical output from said second transmission element may be maintained parallel to the optical input to said first transmission element.

In carrying out the invention it may be arranged that an optical reflector is disposed between said first and second transmission elements whereby the optical output from said second transmission element may be maintained co-axial with the optical input to said first transmission element.

It may be arranged that said optical transmission elements take the form of optical prisms, conveniently of germanium material, and it may also be arranged that the first and second optical prisms are inverted relative to one another.

Advantageously the said scanning means will comprise an opto/mechanical scanning arrangement which affords an optical input to said collimating element.

An exemplary embodiment of the invention will now be described with reference to the accompanying drawings, in which.

Figure 1:
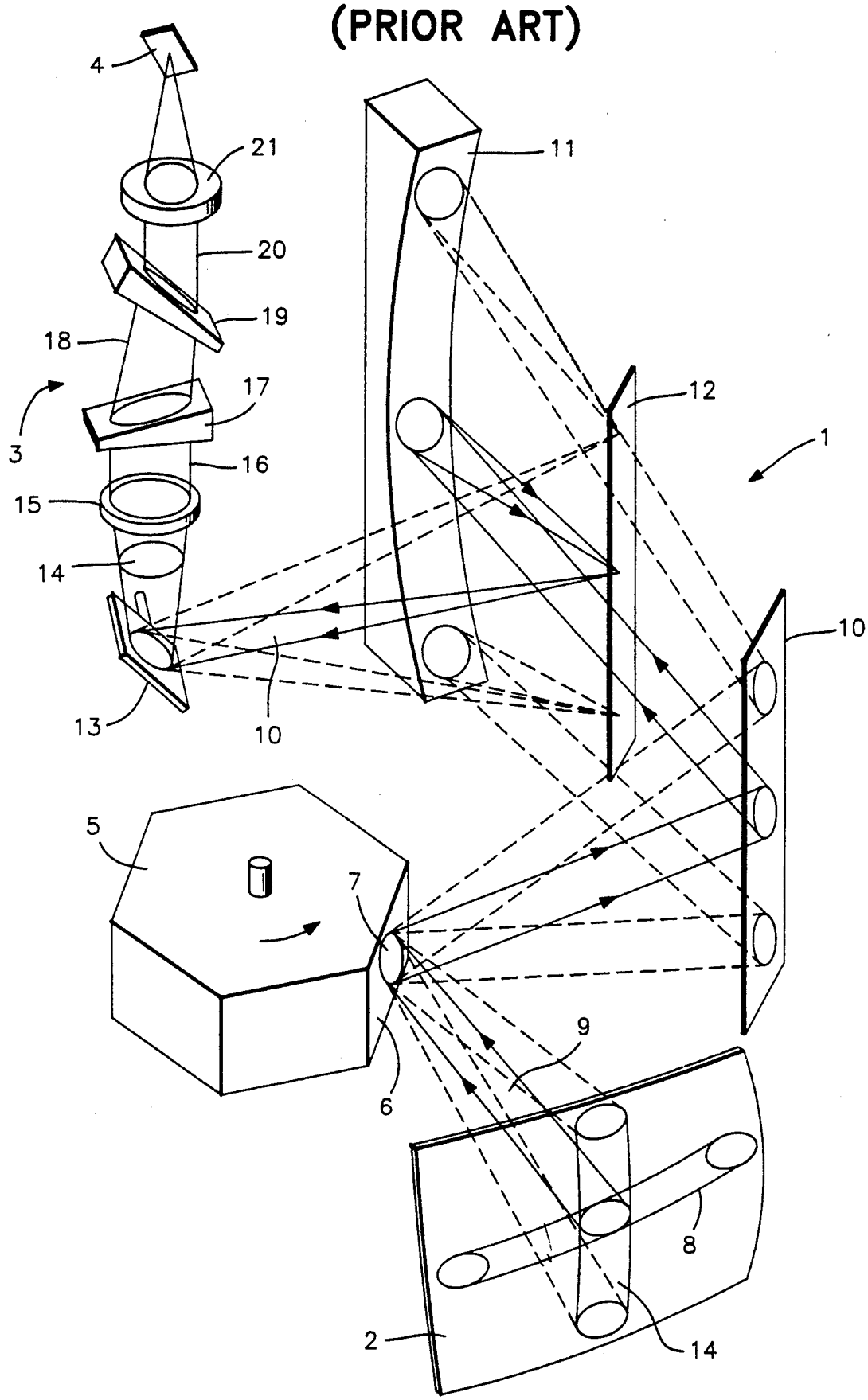
FIG. 1 depicts a prior art form of a thermal imager system incorporating an anamorphic optical system and a Sprite detector.

In FIG. 1 of the drawings there is depicted a known form of thermal imager system which incorporates a scanning system 1 for causing a required scene to be scanned in both the horizontal and vertical directions, and an anamorphic optical system 3 for focusing the scanned signal into a Sprite detector 4.

The scanning system 1 of FIG. 1 comprises a rotating polygon 5, on a face 6 of which an entrance pupil 7 is formed which, as the polygon 5 rotates causes the scene 2 to be scanned in the horizontal direction as shown at 8. The scanned beam 9 is directed by the scanner 5 onto a bend mirror 10 and thence to a relay mirror 11 and line mirror 12 which directs the scanned beam 9 onto a frame or vertical scanning mirror 13 which affords the optical input to the optical system 3.

Vertical scanning of the scene 2 as shown at 14 in FIG. 1, is effected by causing the frame mirror 13 to be pivoted horizontally backwards and forwards.

The scanned beam from the frame mirror 13 is passed through a stop 14 and is collimated by lens 15 to afford a collimated beam 16 to a first optical prism 17. The optical prism 17 causes the beam 16 to be deviated to afford a further beam 18, the size of which, relative to the size of the beam 16, depends on the incidence angle of the beam entering the prism 17 and also the angle and refractive index of the prism 17. The beam 18 is then further deviated by a second optical prism 19 to afford a further beam 20 of possibly different beam size. The beam 20 is directed to a focusing lens 21 by means of which it is focused onto the surface 22 of the Sprite detector 4.

It is arranged that the second prism 19 is inverted relative to the first prism 17 and the anamorphic effect of the system is governed by the relative sizes of the beams 16 and 20. The relative directions of the beams 16 and 20 are governed by the characteristics of the prisms 17 and 19 and their relative orientation, and these may be chosen, for example, to afford beams 16 and 20 which are parallel to one another but are displaced laterally.

It is well known that this arrangement of prisms can provide correction for the affects of wavelength and temperature changes. However, the anamorphic ratio of such optical systems is fixed so that the corresponding focal length is also fixed thereby defining a fixed field of view. As is well known, it is necessary for the Sprite detector 4 to be biased in accordance with this fixed focal length.

If it is required to change the field of view of the imager, it is necessary to change the focal length of the optical system and this is achieved by changing the lenses of the optical system in accordance with the required focal length. However, existing systems based on this approach require also that the bias of the Sprite detector be changed to correspond to the new focal length.

It has now been appreciated that the anamorphic ratio of the optical system 3 of FIG. 1 can be changed by causing the prisms 17 and 19 to be rotated about their axes, which allows the focal length in the vertical direction only to be changed and allows a constant Sprite detector 3 bias to be used.

Figure 2:
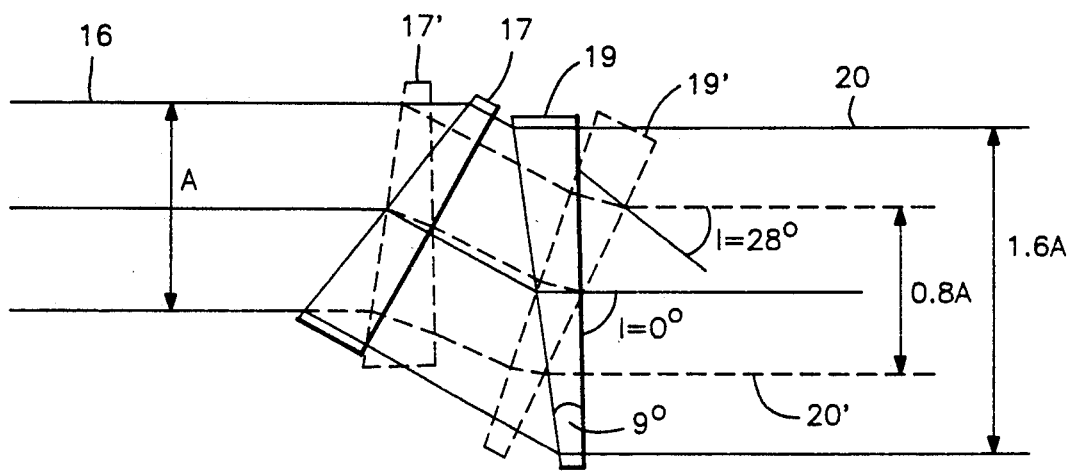
FIG. 2 depicts a modification of part of the optical system of FIG. 1 in accordance with the present invention.

In FIG. 2 of the drawings there is depicted the prisms 17 and 19 of the optical system of FIG. 1 and shows how a variable anamorphic ratio may be obtained by arranging that the prisms 17 and 19 are rotated.

In FIG. 2 the optical prisms 17 and 19 are shown together with the input beam 16 and the output beam 20. Typically the prisms 17 and 19 may be of germanium material and may have an included angle of 9°. When the incidence angle I of the prisms 17 and 19 is 0°, each prism provides an anamorphic change of 1.267, so that the combined anamorphic change between the beams 7 and 3 is 1.6 to 1.

If the prisms 17 and 19 are each arranged to be centrally pivotally mounted on respective axes which are parallel to the front and rear major surfaces respectively of the prisms 17 and 19, and are moved to the positions 17' and 19' respectively, shown in broken lines, where the incidence angle is 28°, the anamorphic ratio for each prism becomes 0.894 and the combined anamorphic ratio of the two prisms 17 and 19 becomes 0.8 so that the output beam 20, from the prism 19' is 0.8 times the size of beam 16. Thus, by changing the positions of the prisms 17 and 19, the anamorphic ratio has been changed from 1.6 to 0.8 and an effective change in focal length of 2.

By careful choice of the pivot point of each of the prisms 17 and 19, the axes of entry and exit of the prisms can be held stationary as the anamorphic ratio and hence the focal length is changed. In general a wide range of focal length variations can be provided for any chosen configuration of axes, and it is possible that the variations could be continuous or in steps.

In the optical system of FIG. 2, it will be appreciated that the beams 20 and 20', although being parallel to the beam 16 are displaced laterally relative to it.

Figure 3:
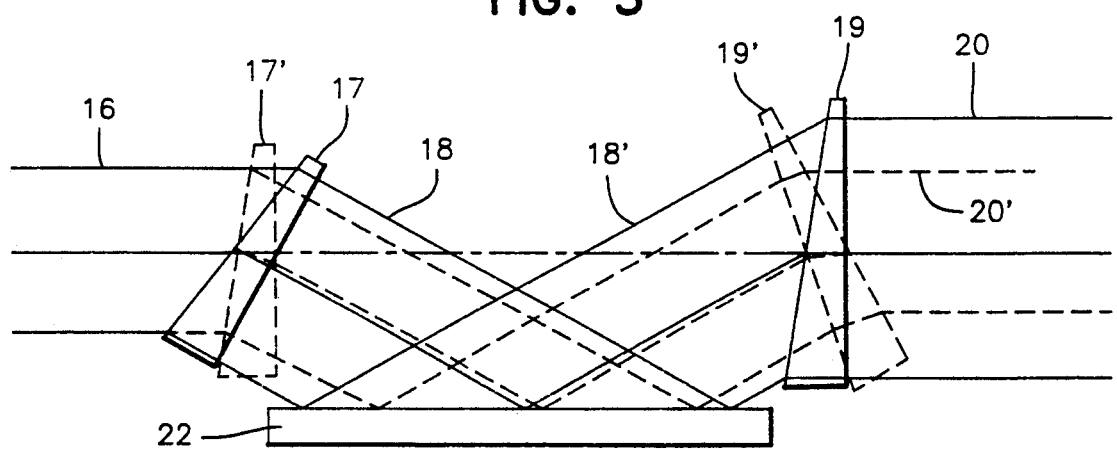
FIG. 3 depicts a further modification of part of optical system of FIG. 1 in accordance with the present invention.

In FIG. 3 there is depicted a modification of the arrangement of FIG. 2 which enables this lateral displacement to be overcome. In FIG. 3 an optical reflector 22 is interposed between the prisms 17 and 19, by means of which the beam 18, from prism 17 is reflected as beam 18' to prism 19. By suitably adjusting the position of the reflector 22 relative to the prisms 17 and 19, any lateral displacement of the beam 20 or 20' can be eliminated.

We claim:

1. A thermal imager system having a variable field of view comprising:

scanning means for scanning a required scene and an anamorphic optical system for focusing the scanned scene onto a fixed biased Sprite detector, said optical system comprising first and second spaced apart optical prisms arranged in series between a collimating element and a focusing element for said Sprite detector, each of said prisms being centrally pivotally mounted on respective axes which are parallel to a major surface of the prisms, said prisms being pivotable in mutually opposite directions while maintaining stationary the axes of entry and exit of said prisms, whereby when said prisms are pivoted, the scan direction focal length of the optical system is maintained substantially constant and the elevation focal length of the optical system is varied for changing the field of view of said imager system.

2. A thermal imager system as claimed in claim 2, in which the optical output from said second optical prism is maintained parallel to the optical input to said first optical prism.

3. A thermal imager system as claimed in claim 1, comprising an optical reflector disposed between said first and second optical prisms, whereby the optical output from said second optical prism is maintained co-axial with the optical input to said first optical prism.

4. A thermal imager system as claimed in claim 1, in which the optical prisms are made of germanium material.

5. A thermal imager system as claimed in claim 1, in which said scanning means comprises an opto/mechanical scanning arrangement which affords an optical input to said collimating element.

* * * * *